(12) United States Patent
Amarger et al.

(10) Patent No.: US 6,462,829 B1
(45) Date of Patent: Oct. 8, 2002

(54) METHOD AND DEVICE FOR CONTROLLING THE PROCESSING OF AN ELECTRONIC DOCUMENT

(75) Inventors: Stephane Amarger, Cesson-Sevigne; Felix Henry, Rennes, both of (FR)

(73) Assignee: Canon Europa N.V., Amsterdam (NL)

( * ) Notice: Subject to any disclaimer, the term of this patent is extended or adjusted under 35 U.S.C. 154(b) by 0 days.

(21) Appl. No.: 09/334,650

(22) Filed: Jun. 17, 1999

(30) Foreign Application Priority Data

Jun. 25, 1998 (FR) .............................. 98 08081

(51) Int. Cl.⁷ ................................ G06K 1/00
(52) U.S. Cl. ...................... 358/1.11; 358/1.13
(58) Field of Search .................. 358/1.1, 1.11, 358/1.15, 1.14, 404, 443, 1.13; 710/1, 8, 9, 10, 11, 14, 15, 16, 62, 63, 64, 65, 72, 240, 243

(56) References Cited

U.S. PATENT DOCUMENTS

| | | |
|---|---|---|
| 4,668,995 | 5/1987 | Chen et al. ................. 358/282 |
| 4,797,741 | 1/1989 | Sato et al. .................. 358/138 |
| 5,333,212 | 7/1994 | Ligtenberg ................... 382/56 |
| 5,630,028 | * 5/1997 | DeMeo ....................... 358/1.11 |
| 5,638,498 | 6/1997 | Tyler et al. ................. 395/117 |
| 5,767,978 | 6/1998 | Revankar et al. ........... 358/296 |
| 6,246,485 | * 6/2001 | Brown et al. .............. 358/1.13 |

* cited by examiner

Primary Examiner—Arthur G. Evans
(74) Attorney, Agent, or Firm—Fitzpatrick, Cella, Harper & Scinto

(57) ABSTRACT

The method of the invention determines conditions for a processing able to be carried out on data of a document, by at least one input/output means.

It includes:
- an operation of determining at least one symbol scatter quantity related to the said document,
- an operation of comparing each said scatter quantity with predetermined values, and
- a configuration determination operation during which the result of each said comparison is taken into account in order to determine the configuration of the input/output means intended to implement this processing.

20 Claims, 2 Drawing Sheets

METHOD AND DEVICE FOR CONTROLLING THE PROCESSING OF AN ELECTRONIC DOCUMENT

The present invention concerns a method and device for controlling the processing of an electronic document. It should be stated here that an electronic document consists of one or more electronic files.

In the computer systems known at the present time, the peripherals (computer or office machinery for data processing, acquisition or representation) generally have parametrizable operating modes, the parameters of which are fixed:

either at the time of manufacturer of the peripheral,
or, by default, by the central unit of the computer system,
or by a dialogue between the user and this computer system.

The operating mode used does not then directly take account of the characteristics of the document to be processed and/or of the constraints for processing this document by this peripheral.

In particular, in the case of a peripheral consisting of a printer, the constraints imposed by the printing of a document including images, for example the constraints of the duration of printing, the restoration of shades or of the quantity of information to be processed, are not directly taken into account by the computer systems in order to fix the printing parameters.

The present invention sets out to remedy these drawbacks.

To this end, the present invention relates, according to a first of its aspect, to a method of configuring a computer peripheral for processing data of a document, characterised in that it includes:

an operation of determining at least one symbol scatter quantity related to the said document,
an operation of comparing each said scatter quantity with at least one predetermined value, and
a configuration operation during which the result of each said comparison is taken into account in order for configuring said computer peripheral intended to implement this processing.

It should be stated here that:

the content of a file corresponds to a format of the data which it contains. By way of example, this content may include text, graphics (or drawings) and/or images;
a pilot configuration concerns both:
a pilot of an input/output means, which is configured, and
several pilots of such means, which are chosen and possibly which are configured; and
the approximate methods based on estimations form part of the methods referred to as heuristic in the literature and make reference to decision criteria, methods or principles used for choosing which of various alternatives is the most effective for achieving an aim. A heuristic is a compromise between on the one hand the need to use simple and/or rapid criteria and on the other hand to discriminate the best choice correctly.

Thus the result of the choice can prove to be ill suited to the processing to be carried out, unlike exact determination methods, which determine a content in a certain manner.

The reader can refer to the book by Judea Pearl, "*Heuristics, intelligent search strategies for computer problem solving*", published by Addison-Wesley Publishing Company, for more information on the concepts of heuristics and approximate determination.

It should be noted here that, in the state of the art known at the date of the present invention, a pilot is a software module in a computer system including a processor, a module dedicated to communication with another system having its operating software for performing a set of elementary operations.

The pilot translates a complex operation required by a high-level software application into a set of elementary operations which can be executed by the peripheral.

Configuring a pilot amounts to fixing the value of each parameter of the said translation. These parameters concern, for example, the translation of the character font into a series of dots able to be formed by the printer, or of the document colour palette into a colour palette of the printer.

Thus, when the invention is, for example, applied to a document to be printed, in order to choose the correct printer configuration:

the document is analysed in order to determine at least one quantity respectively the symbol scatter belonging to said document, as the entropy,
an estimation of the content of the file is then deduced therefrom, text, text and image, or images,
at least one printer suited to this content is determined, which is configured for printing all or part of this document, and
the printer is configured with the configuration data.

It should be stated here that the printer configuration concerns all the operating parameters of the printer.

In the case of the printing of a document, the invention makes it possible:

to improve the print chain, and
automatically to choose the correct configuration of this printer.

According to particular characteristics, the operation of determining a quantity representing symbol scatter includes an entropy determination operation.

By virtue of these provisions, the quantities considered are easy to determine, and accurately discriminate the content of the document. This is because a document including only text has very low entropy whilst documents including coded images (in particular when the coding includes a so-called "entropic" coding) have very high entropy.

According to particular characteristics, the method as briefly disclosed above includes an operation of determining parts of the document and, for each of the said parts:

an operation of determining at least one symbol scatter quantity related to the said document part,
an operation of comparing each said scatter quality with at least one predetermined value, and
a configuration determination operation during which the result of each said comparison is taken into account in order to determine the configuration of the input/output means intended to implement this processing on the said document part.

By virtue of these provisions, for the processing of each part, for example each page, the choice of the input/output means and/or the configuration of the input/output pilot can be optimised for each part of the document to be processed.

According to a second aspect, the invention relates to a device for configuring a computer peripheral for processing data of a document, characterised in that it has:

a means of determining at least one symbol scatter quantity related to the said document,
a means of comparing each said scatter quantity with at least one predetermined value, and a computer peripheral configuration means adapted to take into account the result of each said comparison in order to configure the computer peripheral intended to implement the processing of data of said document.

The invention also relates to a facsimile card, a display screen, a photographic apparatus and a camera including a sensor, characterised in that they include a device as briefly disclosed above.

According to other aspects, the invention also relates to:

- a printer, characterised in that it has a device as briefly disclosed above, wherein said processing means includes a means of printing said document;
- a facsimile machine, characterised in that it has a device as briefly disclosed above, wherein said processing means includes a means of printing said document;
- a facsimile machine, characterised in that it has a device as briefly disclosed above, wherein said processing means includes a means of sending signals representing said document;
- a modulator-demodulator, characterised in that it has a device as briefly disclosed above, wherein said processing means includes a means of sending signals representing said document;
- an information storage device, characterised in that it has a device as briefly disclosed above, wherein said processing means includes a means of compressing data of said document;
- a computer program on a data medium, such as a diskette or a compact disc, characterised in that it implements the method of the invention as briefly disclosed above; and
- a memory, such as a diskette or a compact disc designed to be read by a data processing system, characterised in that it carries program instructions whose execution by the said processing system implements the method of the invention as briefly disclosed above.

The advantages of said device, said printer, said facsimile machine, said electronic facsimile card, said modem, said display screen, said photographic apparatus, said camera, said computer program on a data medium and said memory are identical to those of the method as briefly disclosed above. These advantages are therefore not repeated here.

The invention will be understood more clearly from a reading of the following description, given with reference to the accompanying drawings in which.

In the embodiment described and depicted, the file processing consists of an application for printing data represented by this file. The invention also applies, however, to any data storage processing, data transmission processing or data display processing, with or without data compression.

Figure 1:
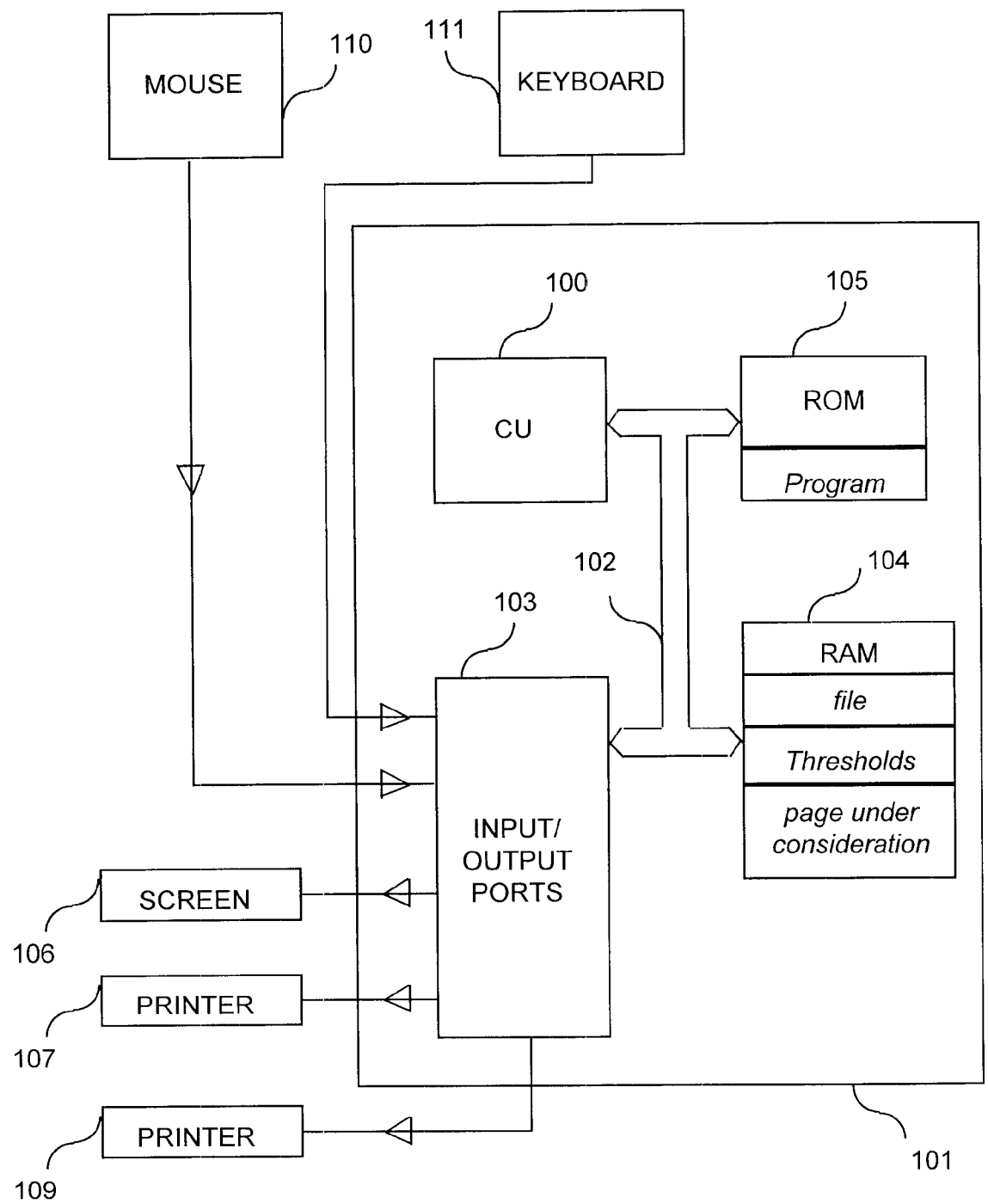
FIG. 1 depicts a device adapted to implement the present invention.

FIG. 1 depicts the main components of an electronic device 101 implementing the present invention. This device 101 has an architecture which is known in the field of programmable electronic systems, based on the use of components connected together by a bus 102 and of a central unit 100 controlled by a program, a simplified algorithm of which was presented in connection with FIG. 2.

For example, these elements are conjointly associated in a personal computer, of a known type, for example of a type operating with a PENTIUM (registered trade mark) microprocessor 100 from the American company INTEL (registered trade mark), which has at least one random access memory 104, a non-volatile memory 105, a screen 106, a mouse 110 and a keyboard 111.

An input/output port 103 receives the digital information coming from the user, by means of the keyboard 111, the mouse 110, a touch screen (not shown) or any other communication means, and transmits it, under the control of the central unit 100, to a random access memory RAM 104. In addition, the input/output port 103 transmits, under the control of the central unit 100:

- to one of the printers 107, which is a monochrome laser printer, or 109, which is an ink jet printer using different operating modes, some of which are adapted to monochrome printing and others to polychrome printing, the data frames intended to control the printer selected in order to print each page of the document to be printed, and
- to the screen 106, the data intended to be displayed.

The random access memory RAM 104, of a known type, contains registers intended to receive parameters, variables, digital data and intermediate processing values, as well as the databases mentioned above.

The non-volatile memory 105, of a known type, stores the program which enables the device and, in particular, the central unit 100, to operate. The central unit 100, of a known type, for example consisting of a microcontroller, controls the operation of the principal components of the information transmission device.

Figure 2:
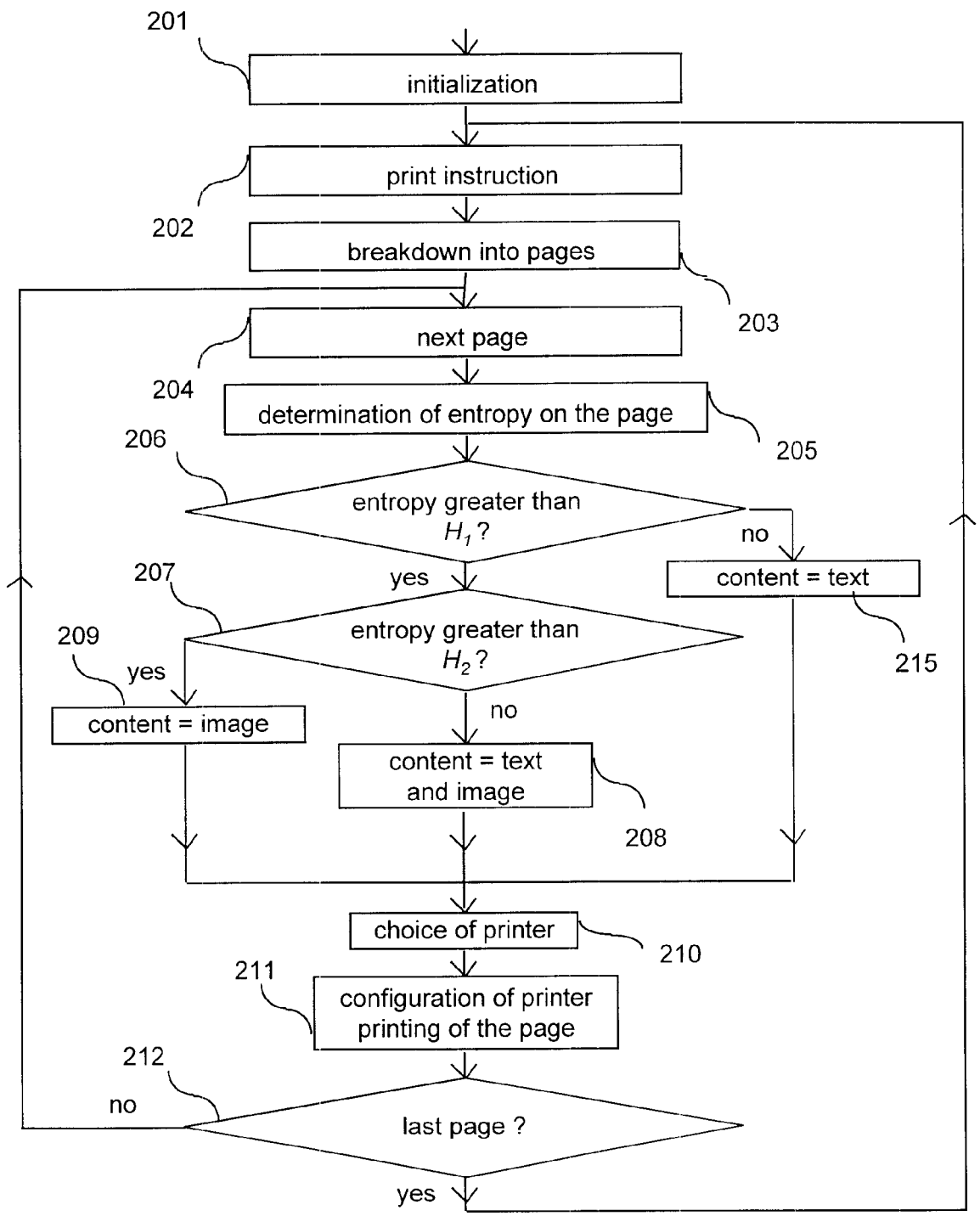
FIG. 2 depicts a flow diagram for the operation of the device illustrated in FIG. 1.

In FIG. 2, operations and tests successively performed by the central unit 100 can be seen.

During an operation 201, the central unit initialises the device illustrated in FIG. 1, by implementing, for example, the known procedures for starting up the WINDOWS 95 (registered trade mark) operating system.

During an operation 202, the user enters an instruction for printing a file "file" stored in the non-volatile memory 105, using the mouse 110 or keyboard 111.

During an operation 203, the central unit 100 breaks the document down into pages to be printed. To this end, the central unit 100 accesses a segment of the file "file" where this information is arranged, or, according to a variant, opens an application able to enable said file to be printed, does the page makeup of said file, and collects the number of pages determined by said operation.

During an operation 204, the central unit 100 takes a following page into consideration. During the first iteration of operation 204, the first page of the document is taken into consideration.

During an operation 205, the central unit 100 determines a quantity representing the symbol scatter in the page under consideration.

To this end, the central unit 100 determines, taking into account the bytes which represent the symbols in the document, the entropy of the page under consideration, in the following manner:

H is the opposite of the sum, for i from 0 to 255, of the products of the rate of appearance of the symbol represented by the byte i, in the page under consideration, on the one hand, and the logarithm to the base 2 of this rate.

It should be stated here that the rate of appearance of a symbol represented by the byte i, appearing $N_i$ times in a page including N symbols, is equal to N/N.

During a test 206, the central unit 100 determines whether or not the said entropy is greater than a first threshold $H_1$. In the present case $H_1=6$.

When the result of the test 206 is positive, during a test 207, the central unit 100 determines whether or not the said entropy is greater than a second threshold $H_2$. In the present case $H_2=7$.

When the result of the test 206 is negative, the page under consideration is allocated a characterisation "text", during an operation 215.

When the result of the test 207 is negative, the page under consideration is allocated a characterisation "text and image" during an operation 208.

When the result of test 207 is positive, the page under consideration is allocated a characterisation "image", during an operation 209.

This is because the inventors discovered that the entropy represents the content of a document, text or image.

By way of example, the following table gives a measurement of entropy for documents which are the most usual at the date of filing of the present patent application. In this table the words WORD and POWERPOINT are registered trade marks.

| DOCUMENT | ENTROPY |
| --- | --- |
| Text (WORD ©) | 3.2 bits/byte |
| Text and graphics (POWERPOINT ©) | 3.9 bits/byte |
| Text and image (POWERPOINT ©) | 6.4 bits/byte |
| GIF image (in a POWERPOINT ©) document in POWERPOINT © format) | 7.2 bits/byte |
| TIFF image | 7.8 bits/byte |
| JPEG image | 7.9 bits/byte |

The content thus determined is stored in the register "content" of the random access memory 104.

In order to determine the values given above, the inventors used the following computer configuration:

- a so-called "IBM PC compatible" computer having an INTEL PENTIUM processor, with a 100 megahertz clock (IBM, INTEL and PENTIUM are registered trade marks), and a 16 megabyte random access memory RAM,
- using the WINDOWS 95 operating system sold by MICROSOFT (WINDOWS, WINDOWS 95 and MICROSOFT are registered trade marks), and
- sets of test documents commonly referred to as "benchmarks".

Then, the choice of the printer best suited to the printing of the assumed content of the file is made, operation 210, and the pilot of this printer is configured, operation 211, taking account of the content of the file "file". To this end, when each printer is installed, a question is posed to the user so that the latter indicates, according to known procedures for dialoging with the device, which printer and which printer configuration is most suited to each document content.

Next, the relevant page of the document is printed by the said printer in said configuration.

Next, during test 212, the central unit 100 determines whether or not the last page has been considered. When the result of test 212 is positive, operation 202 is reiterated. When the result of test 212 is negative, operation 204 is reiterated.

According to a first variant, not shown, a single threshold is used and the content "text and image" is not determined. This variant is suited particularly to the printing of document with a printer which does not have a configuration especially adapted to the "mixture of text and image" mode. According to a second variant, not shown, more than two thresholds are used for associating a document content with each operating mode of a peripheral, for example with different data compression software packages, in order to determine the presence of sounds, colours, etc.

According to a third variant, not shown, the determination of the content does not only take account of the value of the entropy but also of at least one other index.

What is claimed is:

1. Method of configuring a computer peripheral for processing data of a document, characterised in that it includes:

an operation of determining at least one symbol scatter quantity related to the said document (205), an operation of comparing each said scatter quantity with at least one predetermined value (206, 207), and a configuration operation (210, 211) during which the result of each said comparison is taken into account in order for configuring said computer peripheral intended to implement this processing.

2. Method according to claim 1, characterised in that the operation of determining a quantity representing symbol scatter (205) includes an entropy determination operation.

3. Method according to claim 1, characterised in that, during said operation of determining a quantity representing symbol scatter (205), said quantity representing symbols scatter is equal to the opposite of the sum, for i from 0 to 255, of the products of the rate of appearance of the symbol represented by the byte i in the page under consideration, on the one hand, and the logarithm to the base 2 of this rate.

4. Method according to claim 1, including an operation of determining pages of the document (203) and, for each of the said pages:

an operation of determining at least one symbol scatter quantity related to the said document page (205), an operation of comparing each said scatter quantity with at least one predetermined value (206, 207), and a configuration determination operation during which the result of each said comparison is taken into account in order to determine the configuration of the input/output means intended to implement this processing on said document part (210, 211).

5. Device for configuring a computer peripheral for processing data of a document, characterised in that it has:

a means of determining at least one symbol scatter quantity related to the said document (100, 104, 105), a means of comparing each said scatter quantity with at least one predetermined value (100, 104, 105), and a computer peripheral configuration means adapted to take into account the result of each said comparison in order to configure the computer peripheral intended to implement the processing of data of said document (100, 104, 105).

6. Device according to claim 5, characterised in that the means of determining a quantity representing symbol scatter (100, 104, 105) is adapted to determine an entropy.

7. Device according to claim 5, characterised in that the means of determining a quantity representing symbol scatter (100, 104, 105) is adapted so that the said quantity representing symbol scatter is equal to the opposite of the: sum, for i from 0 to 255, of the products of the rate of appearance of the symbol represented by the byte i, in the page under consideration, on the one hand, and the logarithm to the base 2 of this rate.

8. Device according to claim 5, characterized in that it has a means of determining parts of the document (100, 104, 105), the means of determining at least one quantity representing symbol scatter relating to said document being adapted to determine each scatter quantity for each page of the document, the comparison means being adapted to compare each scatter quantity of each page of the document with at least one predetermined value.

9. Device according to claim 8, characterized in that it includes a configuration determination means is adapted, for each part of the document, to take into account the result of each said comparison concerning said document part in order to determine the configuration of the input/output means, a configuration intended for implementing the processing on said part.

10. Printer, characterised in that it has a device according to claim 5, said processing means including a means of printing said document.

11. Facsimile machine, characterised in that it has a device according to claim 5, said processing means including a means of printing said document.

12. Facsimile machine, characterised in that it has a device according to claim 5, said processing means including a means of sending signals representing said document.

13. Modulator-demodulator, characterised in that it has a device according to claim 5, said processing means including a means of sending signals representing said document.

14. Information storage device, characterised in that it has a device according to claim 5, said processing means including a means of compressing data of said document.

15. Display screen, characterised in that it has a device according to claim 5.

16. Photographic apparatus, characterised in that it has a device according to claim 5.

17. Camera including an image sensor, characterised in that it has a device according to claim 5.

18. Computer program on a data medium, characterised in that it implements the method of configuring a computer according to claim 1.

19. Memory, such as a diskette or a compact disc designed to be read by a data processing system, characterised in that it carries program instructions whose execution by said processing system implements the method of configuring a computer according to claim 1.

20. Computer program on a data medium, characterised in that it comprises program instructions for performing the method of configuring a computer according to claim 1, when said data medium is loaded into a computer.

* * * * *

UNITED STATES PATENT AND TRADEMARK OFFICE
CERTIFICATE OF CORRECTION

PATENT NO. : 6,462,829 B1 Page 1 of 1
DATED : October 8, 2002
INVENTOR(S) : Stephane Amarger et al.

It is certified that error appears in the above-identified patent and that said Letters Patent is hereby corrected as shown below:

Column 1,
Line 14, "manufacturer" should read -- manufacture --.
Line 31, "of its" should be deleted.

Column 2,
Line 49, "quality" should read -- quantity --.

Column 4,
Line 60, "N/N" should read -- $N_i/N$ --.

Column 6,
Line 20, "symbols" should read -- symbol --.
Line 27, "the" should be deleted.
Line 34, "the input/output" should read -- an input/output --.
Line 36, "past" should read -- page --.
Line 55, "the:" should read -- the --.
Line 61, "parts" should read -- pages --.

Column 7,
Line 2, "means is" should read -- means (210) --.
Lines 3 and 4, "part" should read -- page.
Line 5, "the input/output" should read -- an input/output --.
Line 6, "a" should read -- said --.
Line 7, "part." should read -- page. --.

Signed and Sealed this

Thirteenth Day of May, 2003

JAMES E. ROGAN
*Director of the United States Patent and Trademark Office*